Aug. 8, 1961    A. R. LEO    2,995,376
GOLF TRAINING DEVICE
Filed May 27, 1959    2 Sheets-Sheet 1

INVENTOR.
ANTHONY R. LEO
BY Arthur H. Seidel
ATTORNEY

Aug. 8, 1961  A. R. LEO  2,995,376
GOLF TRAINING DEVICE
Filed May 27, 1959  2 Sheets-Sheet 2
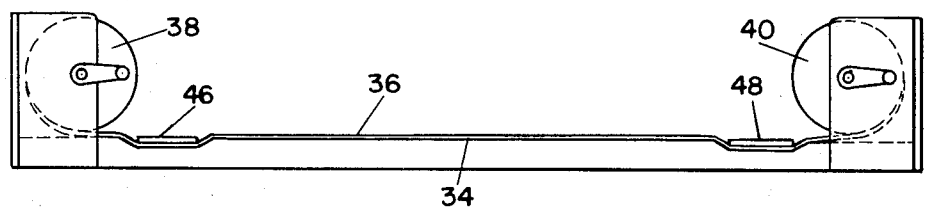
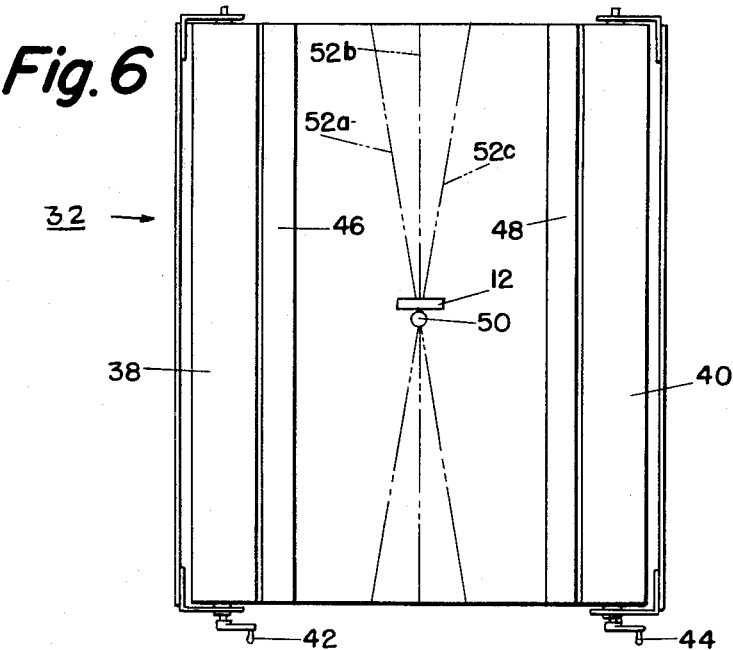
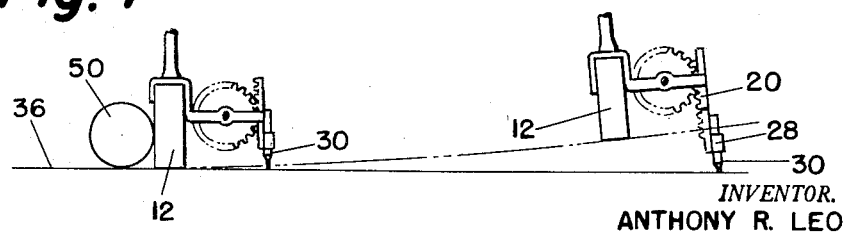
INVENTOR.
ANTHONY R. LEO
BY Arthur H. Seidel
ATTORNEY

United States Patent Office 2,995,376
Patented Aug. 8, 1961

2,995,376
GOLF TRAINING DEVICE
Anthony R. Leo, 245 Parkview Ave., Bronxville, N.Y.
Filed May 27, 1959, Ser. No. 816,260
3 Claims. (Cl. 273—186)

The present invention is directed to a golf training device, and more particularly to a device which will enable a golfer to secure a permanent record of his backswing and forward swing for each putt that he makes, thereby affording him a means of correcting whatever fault is causing his ball to go off line.

Accurate putting is a desideratum of all golfers. Since even a relatively small deflection of the putter blade will seriously affect the accuracy of a golfer's putting, it is most desirable that golfers have the opportunity of observing whatever defects there may be in their putting, in order to correct the same.

This invention has as an object the provision of a device which will give a golfer an accurate permanent record of his putting strokes, and which will permit him to take whatever necessary corrective measures may be needed to compensate for deficiencies in his putting and to evaluate the efficacy of his corrective measures.

Other objects will appear hereinafter.

For the purpose of illustrating the invention there is shown in the drawings forms which are presently preferred; it being understood, however, that this invention is not limited to the precise arrangements and instrumentalities shown.

Referring to the drawings, wherein like reference characters refer to like parts:

FIGURE 5 is an elevational view revealing a plotting board on which the track of the golfer's putting stroke may be recorded.

FIGURE 6 is a plan view of the plotting board of FIGURE 5 revealing a plurality of putting tracks.

FIGURE 7 is a diagrammatic view revealing how the golf training device shown in FIGURES 1 and 2 enables the track of the golfer's putt to be recorded on paper even though the blade of the putter is lifted off from the surface of the plotting board at the end of the stroke.

Figure 1:
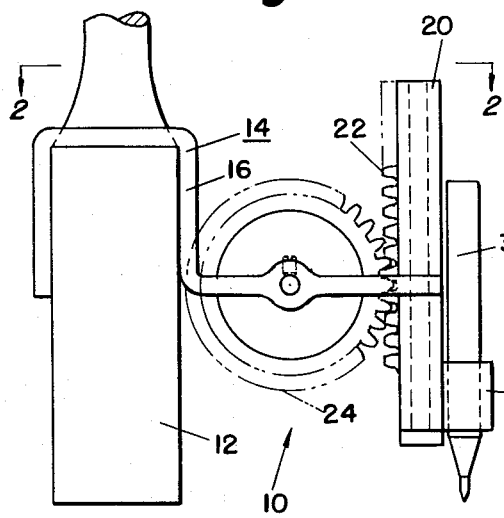
FIGURE 1 is a view revealing the preferred embodiment of the golf training device of the present invention.

Referring to the drawings, and initially to FIGURES 1 and 2 and 5, 6, and 7, the golf tracking device shown therein is designated generally as 10. Such golf tracking device is shown applied to the blade 12 of a putter.

Figure 2:
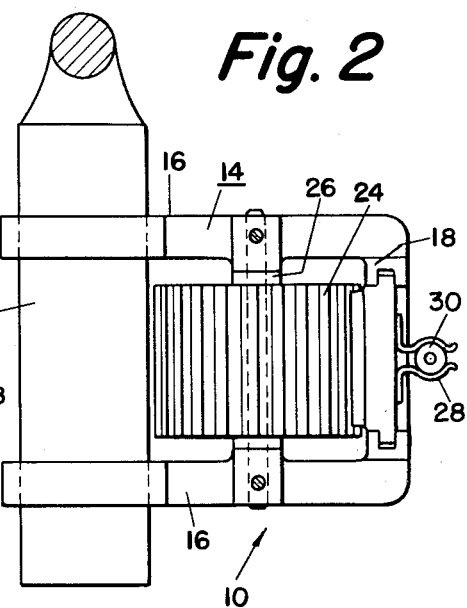
FIGURE 2 is a view taken on line 2—2 of FIGURE 1.

The frame 14 of the golf tracking device 10 is frictionally engaged with the top surface and the top portions of the faces of the putter blade 12. Thus, the frame 14 is formed of flexible metal and comprises the arms 16 and 16 which are bent so as to embrace the top portion of the putter blade 12 as shown in FIGURES 1 and 2. The arms 16 and 16 of frame 14 are joined together by cross-piece 18 which carries the rack bar 20. The rack bar 20 is provided with teeth 22 which engage mating teeth of the pinion 24 which is rotatably carried on the shaft 26 which is borne by the arms 16 and 16 of frame 14.

A scriber holder 28 within which the pencil 30 is carried is secured to the bottom portion of the face of the rack bar 20 opposite to the teeth 22. The scriber holder 28 comprises spring clip fingers, so that the relative height of the pencil 30 carried therewithin may be axially adjusted.

The plotting board 32 on which the track of the putt of the golfer is drawn is shown particularly in FIGURES 5 and 6. Such plotting board 32 comprises a flat supporting surface 34 over which the plotting paper 36 is carried. The plotting paper 36 extends between the rollers 38 and 40, which comprise respective hand-cranks 42 and 44 for effecting rotation of the rollers 38 and 40 and resultant displacement of the plotting paper 36 therebetween. Guides 46 and 48 are provided adjacent the rollers 38 and 40 for maintaining the tautness of the plotting paper 36.

The operation of the golf training device 10 of the present invention is shown particularly in FIGURE 7. As seen therein, movement of the putter blade 12 away from the golf ball 50 during the course of the backswing does not effect disengagement of the tip of the pencil 30 from the surface of the plotting paper 36, notwithstanding the elevation of the bottom of the putter blade 12 above the plotting paper 36. Thus, as the putter blade 12 rises above the plotting paper 36, the weight of the rack bar 20 and its associated scriber holder 28 and pencil 30 will cause the rack bar 20 to move downwardly, with such downward movement being regulated by the rotation of the pinion 24. This will result in the plotting of a track, such as one of the tracks 52 shown in FIGURE 6. The golf training device 10 will similarly perform when the putter blade 12 advances after engaging the golf ball 50, so that each of the tracks 52 will plot the path of the putter blade both prior to and subsequent to its engagement with the golf ball.

FIGURE 6 reveals three tracks, namely tracks 52a, 52b, and 52c. In track 52b the golfer has squarely struck the golf ball 50 with the putter blade 12 without diverting the putter blade from its straight direct path. In both the tracks 52a and 52c, the putter blade 12 has not squarely engaged the golf ball 50, but instead has veered from the perfect path shown in track 52b.

The golfer may record a continuing series of swings, by advancing the plotting paper 36 between the rollers 38 and 40. In this manner, a golfer may maintain a visual record of his improvement, and may periodically check his putting.

Figure 3:
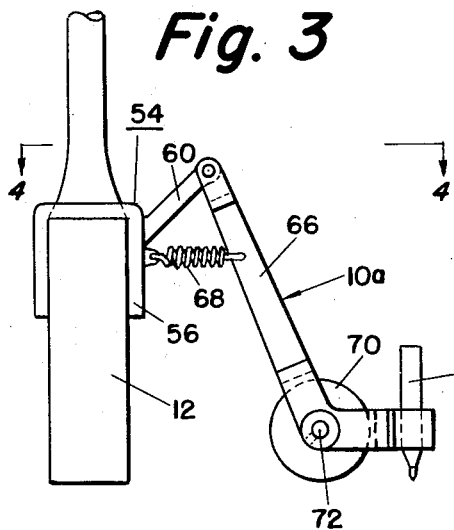
FIGURE 3 is a view revealing another embodiment of the golf training device of the present invention.
Figure 4:
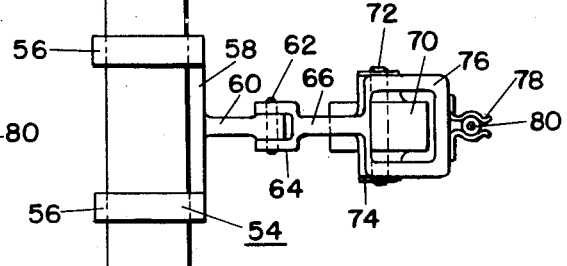
FIGURE 4 is a view taken on line 4—4 of FIGURE 3.

In the embodiment of the golf tracking device 10a shown in FIGURES 3 and 4, the putter blade 12 is straddled by the frame 54 which comprises a pair of inverted U-shaped arms 56 joined together by the crosspiece 58. A fixed link member 60 is secured to the crosspiece 58. The link member 60 carries the pivot 62 on which the clevis 64 of the link member 66 is pivotably mounted. A helical spring 68 joins the cross-piece 58 to the link member 66, so that the link member 66 is spring-urged towards the putter blade 12.

A guide wheel 70 is pivotably mounted on shaft 72 carried by the clevis 74 at the bottom end of the link member 66.

The scribe holder 76 is pivotably mounted on the shaft 72. Scribe holder 76 comprises a generally U-shaped member whose arms embrace the guide wheel 70. The scribe holder 76 includes the spring clip fingers 78 within which the pencil 80 is received.

The present invention may be embodied in other specific forms without departing from the spirit or essential attributes thereof and, accordingly, reference should be made to the appended claims, rather than to the foregoing specification as indicating the scope of the invention.

I claim:

1. A golf training device comprising an attachment means attachable to a putter blade, a scribe holder receiving a marking pencil, and means intermediate said scribe holder and said attachment means for providing said scribe holder and pencil with reciprocating movement relative to the putter blade, said last mentioned means including a rack bar meshingly engaged with a pinion on said attachment means, and said scribe holder being secured to said rack bar.

2. A golf training device in accordance with claim 1 including a flat surface surmounted by plotting paper over which said putter blade may be swung, one end of said paper being wrapped on a roller, whereby said paper may be unwound from said roller after a portion thereof has been marked by said pencil so that an unmarked portion of said paper is exposed.

3. A golf training device in accordance with claim 1 wherein said pencil is secured to said scribe holder by a pair of spaced spring clips.

References Cited in the file of this patent

UNITED STATES PATENTS

| | | |
|---|---|---|
| 337,503 | King | Mar. 9, 1886 |
| 686,265 | Crowe | Nov. 12, 1901 |
| 1,651,264 | Fish | Nov. 29, 1927 |
| 1,829,449 | Kalbach | Oct. 27, 1931 |
| 2,894,755 | Scelzo | July 14, 1959 |